(12) United States Patent
Gandhi

(10) Patent No.: US 8,626,604 B1
(45) Date of Patent: Jan. 7, 2014

(54) AGGREGATING PRODUCT ENDORSEMENT INFORMATION

(75) Inventor: Kawaljit Gandhi, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/111,681

(22) Filed: May 19, 2011

(51) Int. Cl.
  *G06Q 30/00* (2012.01)
(52) U.S. Cl.
  USPC ............................. 705/26.35; 705/26.1
(58) Field of Classification Search
  USPC .................... 705/26.1, 27.1, 26.35
  See application file for complete search history.

(56) References Cited

U.S. PATENT DOCUMENTS

| | | | |
|---|---|---|---|
| 2009/0063247 A1 | 3/2009 | Burgess et al. | |
| 2011/0191211 A1 | 8/2011 | Lin | |
| 2012/0150598 A1* | 6/2012 | Griggs | 705/14.16 |
| 2012/0221563 A1* | 8/2012 | De et al. | 707/728 |
| 2012/0260209 A1* | 10/2012 | Stibel et al. | 715/780 |

FOREIGN PATENT DOCUMENTS

| | | | |
|---|---|---|---|
| WO | WO 2006/065546 A2 | 6/2006 | |
| WO | WO 2011/019749 A2 | 2/2011 | |

OTHER PUBLICATIONS

Business Editors, &. I. W. "BizRate.com surpasses yahoo shopping to become 2nd biggest online marketplace; five times higher sales conversion rate makes BizRate.com leading driver of online buyers," Business Wire, (Mar. 15, 2000).*
U.S. Appl. No. 13/165,761, filed Jun. 21, 2011.
U.S. Appl. No. 13/230,277, filed Sep. 12, 2011
U.S. Appl. No. 13/227,459, filed Sep. 7, 2011.
U.S. Appl. No. 13/598,106 to Ma et al., filed Aug. 29, 2012.
U.S. Appl. No. 13/802,681 to Jackson et al., filed Mar. 13, 2013

* cited by examiner

*Primary Examiner* — Brandy A Zukanovich
(74) *Attorney, Agent, or Firm* — Johnson, Marcou & Isaacs, LLC

(57) ABSTRACT

A "likeness factor" indicating users' endorsements of a product is disclosed. "Likes," "dislikes," and other favorable or unfavorable user input for a product are collected from a website that displays the product and that logs such information. The collected information is made available on other websites displaying the product either directly or in the form of a likeness factor. The information can be aggregated from multiple websites and sources. A likeness factor for a manufacturer or other merchant is based on likeness factors for products of the manufacturer. Changes in likeness factor over time indicate a trend for products and manufacturers and can be used to predict product performance. Search results are filtered by likeness factor, and advertisements are presented based on likeness factor.

30 Claims, 11 Drawing Sheets

US 8,626,604 B1

AGGREGATING PRODUCT ENDORSEMENT INFORMATION

TECHNICAL FIELD

The present disclosure relates generally to electronic product catalogs and, more specifically, to aggregating endorsement information from users and associating the endorsement information with products in the product catalog.

BACKGROUND

Computer networks, such as the Internet, enable transmission and reception of a vast array of information. In recent years, for example, some commercial retail stores have attempted to make product information available to customers over the Internet. It is becoming increasingly popular to provide mechanisms by which consumers can indicate how favorably or unfavorably they view each product. For example, users may click a radio button or other control on a website to indicate that they "like" or "dislike" a particular product displayed on the website. The website logs the "likes" and "dislikes" received for the particular product. The number and value of "likes" and "dislikes" are indications of user endorsement of the product.

However, the "likes" and "dislikes" are logged for a particular product only on the particular website that collects this information. The "likes" and "dislikes" collected on a particular website are not available on other websites that display the same product. Additionally, "likes" and "dislikes" logged on one or multiple websites cannot be aggregated to provide an overall indication (or a factor of indication) of the users endorsement of the product. Furthermore, a particular product on a popular website may have received many "likes" and "dislikes", but the same product on a different website may have received zero or very few "likes" and "dislikes". The "likes" and "dislikes" for the product on the popular website cannot be attributed to the same product on the different website.

Therefore, it is desirable to make users endorsements obtained on one website available on other websites. Additionally, it is desirable to aggregate users endorsements from multiple websites into an overall indication of endorsement and to make that overall indication available on multiple websites. It is further desirable to determine an indication of endorsement for a manufacturer based on endorsements of products of the manufacturer. It is also desirable to determine endorsement trends of products and manufacturers over time and to predict product and/or product sector performance based on those trends. Furthermore, it is desirable to filter search results based on endorsements and to present advertisements based on endorsements.

SUMMARY

According to one aspect, a computer-implemented method for aggregating endorsement information for a product includes receiving a multiple indications of endorsement for the product from a first electronic source associated with the product. Each indication of endorsement received from the first electronic source is associated with a social site. Multiple indications of endorsement for the product also are received from a second electronic source associated with the product. Each indication of endorsement received from the second electronic source is associated with a social site. The indications of endorsement from the first and second electronic sources are aggregated, and the aggregated indications of endorsement are communicated for presentation via a third electronic source.

According to another aspect, a computer-implemented method for communicating endorsement information for a product includes receiving a plurality of indications of endorsement for the product. Each indication of endorsement is associated with a social site. Each indication of endorsement is obtained from a first electronic document associated with the product. Then, the indications of endorsement for the product are communicated for presentation via a second electronic document associated with the product.

These and other aspects, objects, features, and advantages of the exemplary embodiments will become apparent to those having ordinary skill in the art upon consideration of the following detailed description of illustrated exemplary embodiments, which include the best mode of carrying out the invention as presently perceived.

DETAILED DESCRIPTION OF EXEMPLARY EMBODIMENTS

Overview

Figure 1:
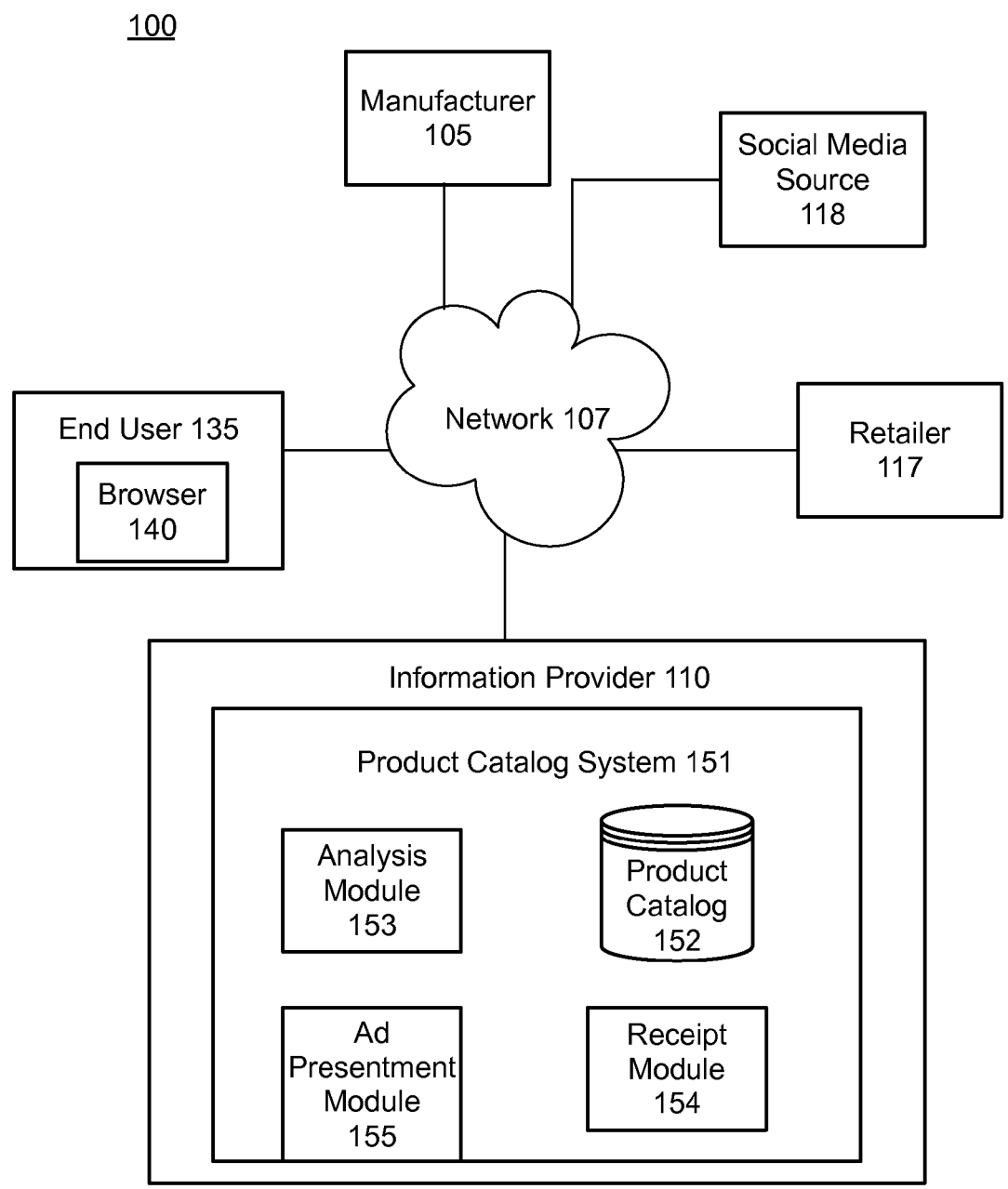
FIG. 1 is a block diagram depicting a system for aggregating endorsement information according to an exemplary embodiment.

The methods and systems described herein enable collection of endorsement information for a product displayed on a website. The collected endorsement information can then be made available on other websites that display the product. Additionally, the methods and systems described herein enable aggregation of endorsement information for a product, where the endorsement information is obtained from multiple websites on which the product is displayed. The aggregated information provides a more thorough indication of the endorsements of the product.

The system includes a product catalog system, which is implemented in hardware and/or software. The product catalog system receives information regarding products offered from multiple merchants. For simplicity, manufacturers, retailers, and others that sell products to customers may sometimes be referred to herein as "merchants." Generally, the product information typically includes, for each product, a product title, a product description, pricing information, a product category, one or more images of the product, and a product identifier, such as a global trade item number ("GTIN"), universal product code ("UPC"), manufacturer's part number ("MPN"), international standard book number ("ISBN"), European article number ("EAN"), Japanese Article Number ("JAN"), and/or brand name and model number combination. As used throughout this specification, the term "products" should be interpreted to include tangible and intangible products and/or services.

An analysis module of the product catalog system can collect and analyze endorsement information for each product. In an exemplary embodiment, the collected information can be obtained from a particular website, such as a manufacturer's website. Then, the analysis module can provide the collected information to retailers for presentation with the corresponding product information on other websites associated with the retailers. The endorsement information can be provided directly to the retailers or can be converted into an endorsement rating that can be provided to the retailers. In an alternative exemplary embodiment, the collected information can be obtained from multiple websites and aggregated into an endorsement rating based on the information collected from the multiple websites. Then, the analysis module can provide the endorsement rating to merchants for presentation with the corresponding product information on websites displaying the product. The endorsement rating also can be used to filter search results by ranking and presenting products in order of highest endorsement rating or by limiting search results to a number of products based on the highest endorsement ratings or a threshold endorsement rating.

The analysis module also can determine an endorsement rating for a manufacturer based on endorsement ratings for products of the manufacturer. In this case, the analysis module aggregates the endorsement ratings for products of the manufacturer to create an endorsement rating for the manufacturer.

The analysis module also can determine an endorsement rating trend of a product over time or of a manufacturer over time. In this case, for a product, the analysis module collects endorsement information for the product at a first time and at a later time. Then, the analysis module compares the endorsement rating corresponding to the first time with the endorsement rating corresponding to the later time and determines the trend of the endorsement rating for the product. A similar analysis can be performed for a manufacturer, based on the trend of the endorsement rating for the manufacturer.

An advertisement module of the product catalog system can present advertisements based on endorsement ratings. Products and search results can be ranked based on their corresponding endorsement ratings. Then, the advertisement module retrieves advertisements for the products with the highest endorsement ratings. The retrieved advertisements can be presented with the search results.

The analysis module also can predict product sector performance based on endorsement ratings. In this case, an endorsement rating trend for a product is determined over a period of time. Based on this trend, the analysis module can determine whether a similar product produced by another manufacturer or another product in the same product sector would fare well in the same market. The analysis module also can consider endorsement ratings trends of manufacturers in this analysis.

One or more aspects of the invention may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as the act may be performed by more than one computer. The inventive functionality of the invention will be explained in more detail in the following description, read in conjunction with the figures illustrating the program flow.

Turning now to the drawings, in which like numerals indicate like elements throughout the figures, exemplary embodiments of the invention are described in detail.

System Architecture

FIG. 1 is a block diagram depicting a system 100 for aggregating endorsement information according to an exemplary embodiment. As depicted in FIG. 1, the system 100 includes network devices 105, 110, 117, 118, and 135 that are configured to communicate with one another via one or more networks 107.

Each network 107 includes a wired or wireless telecommunication means by which network devices (including devices 105, 110, 117, 118, and 135) can exchange data. For example, each network 107 can include a local area network ("LAN"), a wide area network ("WAN"), an intranet, an Internet, a mobile telephone network, or any combination thereof. Throughout the discussion of exemplary embodiments, it should be understood that the terms "data" and "information" are used interchangeably herein to refer to text, images, audio, video, or any other form of information that can exist in a computer-based environment.

Each network device 105, 110, 117, 118, and 135 includes a device capable of transmitting and receiving data over the network 107, such as one or more computers. For example, each network device 105, 110, 117, 118, and 135 can include a server, desktop computer, laptop computer, smartphone, handheld computer, personal digital assistant ("PDA"), or any other wired or wireless, processor-driven device. In the exemplary embodiment depicted in FIG. 1, the network devices 105, 110, 117, 118, and 135 are operated by manufacturer, an information provider, a retailer, a social media source, and end user customers, respectively. The system 100 may include additional devices 105, 110, 117, 118, and 135 as desired.

The end user network devices 135 each include a browser application module 140, such as Microsoft Internet Explorer, Firefox, Netscape, Google Chrome, or another suitable application for interacting with web page files maintained by the information provider network device 110 and/or other network devices 105, 117, 118. The web page files can include text, graphic, images, sound, video, and other multimedia or data files that can be transmitted via the network 107. For example, the web page files can include one or more files in the HyperText Markup Language ("HTML"). The browser application module 140 can receive web page files from the network devices 105, 110, 117, and 118 and can display the web pages to an end user operating the end user network device 135. In certain exemplary embodiments, the web pages include information from a product catalog 152 of a product catalog system 151, which is maintained by the information provider network device 110. The product catalog system 151 is described in more detail hereinafter with reference to the method illustrated in FIG. 2.

System Process

Figure 2:
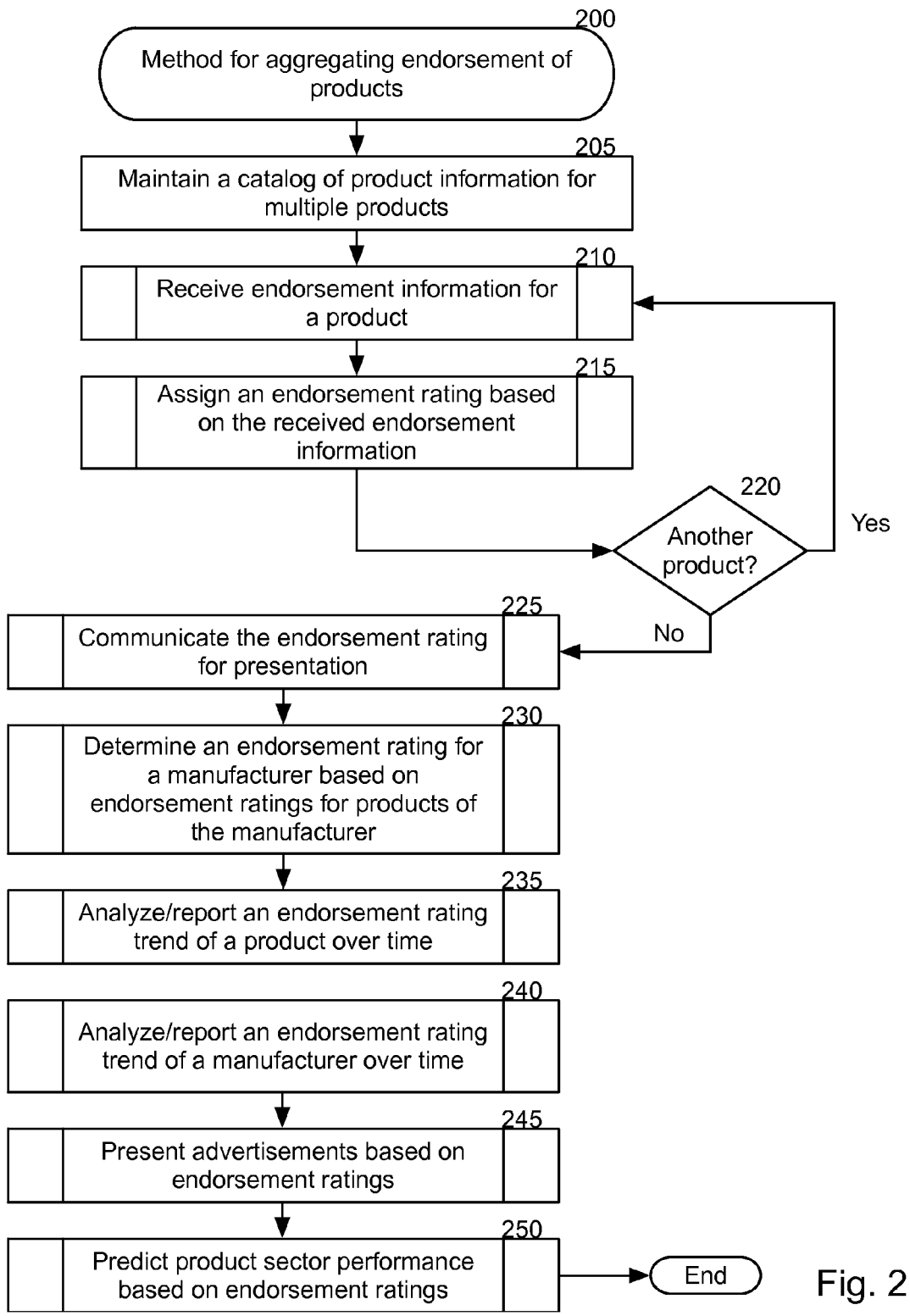
FIG. 2 is a block flow diagram depicting a method for aggregating endorsement information of products according to an exemplary embodiment.

FIG. 2 is a block flow diagram depicting a method 200 for aggregating endorsement information of products according to an exemplary embodiment. The method 200 is described with reference to the components illustrated in FIG. 1.

In block 205, the product catalog system 151 maintains the product catalog 152. The product catalog 152 includes a data structure, such as one or more databases and/or electronic records, that includes information regarding products from at least one merchant, such as the manufacturer 105. For each product, the information typically includes at least a product identifier, such as a global trade item number ("GTIN"), an international standard book number ("ISBN"), a universal product code ("UPC code"), a European article number ("EAN"), a manufacturer part number ("MPN"), a Japanese article number ("JAN"), a brand name and model number combination, and/or another standardized or non-standardized identifier. The product information also can include, for each product, a product title, a product description, pricing information, a product category, one or more images of the product, and any other information associated with the product. As described hereinafter, the product information also can include endorsement information, comprising an endorsement rating.

Generally, the product identifiers uniquely identify their corresponding products. Information, other than the aforementioned product identifiers, that uniquely identifies a product also can be used as a product identifier. For example, a product identifier may be a string of alphanumeric characters and/or symbols that uniquely identify a product. In another example, a product identifier may be a product title, a product description, a trademark or service mark for a product or service, or a Uniform Resource Locator ("URL") or other type of link to a product or associated with a product. In certain exemplary embodiments, the product identifier may include a portion of one of the aforementioned product identifiers only. For example, some product identifiers, such as UPCs, include information identifying a manufacturer and a product. In certain exemplary embodiments, the product identifier stored in the product catalog 152 includes the portion of the product identifier that identifies the product only or some other portion of the product identifier.

In certain exemplary embodiments, a receipt module 154 of the product catalog system 151 receives information that is included in the product catalog 152 in electronic data feeds and/or hard copy provided by one or more merchants, such as manufacturer 105, and/or another information source, such as the retailer 117, social media source 118, another specialized information aggregator, or an Internet web site. For example, each manufacturer 105 and/or other source may periodically provide batched or unbatched product data in an electronic feed or electronic storage media to the receipt module 154. The receipt module 154 also may receive product information from scanned product documentation and/or catalogs. In certain exemplary embodiments, the receipt module 154 also may receive the product data from a screen-scraping mechanism, which is included in or associated with the product catalog system 151. For example, the screen-scraping mechanism may capture product information from manufacturer, retailer, social media source, or other merchant and/or information provider websites.

In block 210, the receipt module 154 or another module receives endorsement information for one or more products. That is, the receipt module 154 or another module receives endorsement information that is associated with a product. The endorsement information provides an indication of a user's recommendation or perceived value of the product. In certain exemplary embodiments, the endorsement information is an indication of a user's "like" or "dislike" of the product. For example, users may select a radio button or other control on a website to indicate that the users view the product favorably or unfavorably. The website or other information source logs the users' selections to count the total number of favorable or unfavorable indications.

The endorsement information is collected from social networking sites ("social sites") or an extension thereof. Social sites function like an online community of Internet users. Social sites often group specific individuals or organizations together. While there are a number of social sites that focus on particular interests, there are others that do not. The websites without a main focus usually have open memberships. This means that anyone can become a member, regardless of his or her hobbies, beliefs, or views. Such sites may be not require a membership but may allow anyone to participate with registration.

In certain examples, websites, companies, or applications, such as Facebook, Google Plus 1, Buzz, YouTube, Twitter, or other suitable entity, log such endorsement information. Such entities may allow manufacturers, retailers, or other merchants to include the above-described controls on their websites, where the controls allow the entities to log the favorable and unfavorable selections of the controls. For instance, the controls may allow a user to "like" or "dislike" a product, select "Plus 1" to indicate a favorable view of the product, "share" a webpage (or product or other information on a webpage or other electronic document), or "tweet" a favorable or unfavorable view of the product. The controls log the users' selections and aggregate the count of each specific selection for the corresponding website.

In certain exemplary embodiments, the product catalog system 151 includes a web crawler that browses the Internet for endorsement information. For example, the receipt module 154 may receive the endorsement information from a screen-scraping mechanism, which is included in or associated with the product catalog system 151. The screen-scraping mechanism may capture endorsement information from merchant and/or information provider web sites. For example, many merchants and consumer web sites include endorsement information submitted by consumers or published by product experts that have interacted with the product. The screen-scraping mechanism can seek out and capture this information.

In certain exemplary embodiments, the receipt module 154 receives the endorsement information via an electronic feed or electronic storage media provided by one or more merchants, one or more social media sources, and/or another source. An example of another source is an Internet web site having forums or message boards for consumers to provide endorsement information, which may provide batched or unbatched endorsement information in an electronic feed or electronic storage media to the receipt module 154.

In certain exemplary embodiments, the receipt module 154 may obtain the endorsement information directly from one or more social media sources 118. Such social media sources 118 may provide the endorsement information in response to a request from the receipt module 154. For example, the receipt module 154 may communicate a request to the social media source network device 118 to receive endorsement information associated with a product on a particular uniform resource locator ("URL"). In response, the social media source network device 118 returns the endorsement information collected at the specified URL.

Block 210 will be described in further detail hereinafter with reference to FIG. 3.

Regardless of how the endorsement information is received, in block 215, an analysis module 153 assigns an endorsement rating for each product based on the endorsement information for the corresponding product. Block 215 will be described in further detail hereinafter with reference to FIG. 4.

Via block 220, the method 200 repeats blocks 210 and 215 for each product in the product catalog 152 and thereby receives endorsement information, where available, for each product and assigns an endorsement rating for each product. After assigning an endorsement rating for each product, the method 200 proceeds to block 225.

In block 225, the product catalog system 151 communicates the endorsement rating for presentation. Block 225 will be described in further detail hereinafter with reference to FIGS. 5 and 6.

In block 230, the analysis module 153 determines an endorsement rating for a manufacturer based on endorsement ratings for products of the manufacturer. Block 230 be described in further detail hereinafter with reference to FIG. 7

In block 235, the analysis module 153 analyzes and reports an endorsement rating trend of a product over time. Block 235 will be described in further detail hereinafter with reference to FIG. 8.

In block 240, the analysis module 153 analyzes and reports an endorsement rating trend of a manufacturer over time. Block 240 will be described in further detail hereinafter with reference to FIG. 9.

In block 245, an advertisement presentment module 155 of the product catalog system 151 presents advertisements based on endorsement ratings for products. Block 245 will be described in further detail hereinafter with reference to FIG. 10.

In block 250, the analysis module 153 predicts product and product sector performance based on endorsement ratings. Block 250 will be described in further detail hereinafter with reference to FIG. 11.

Figure 3:
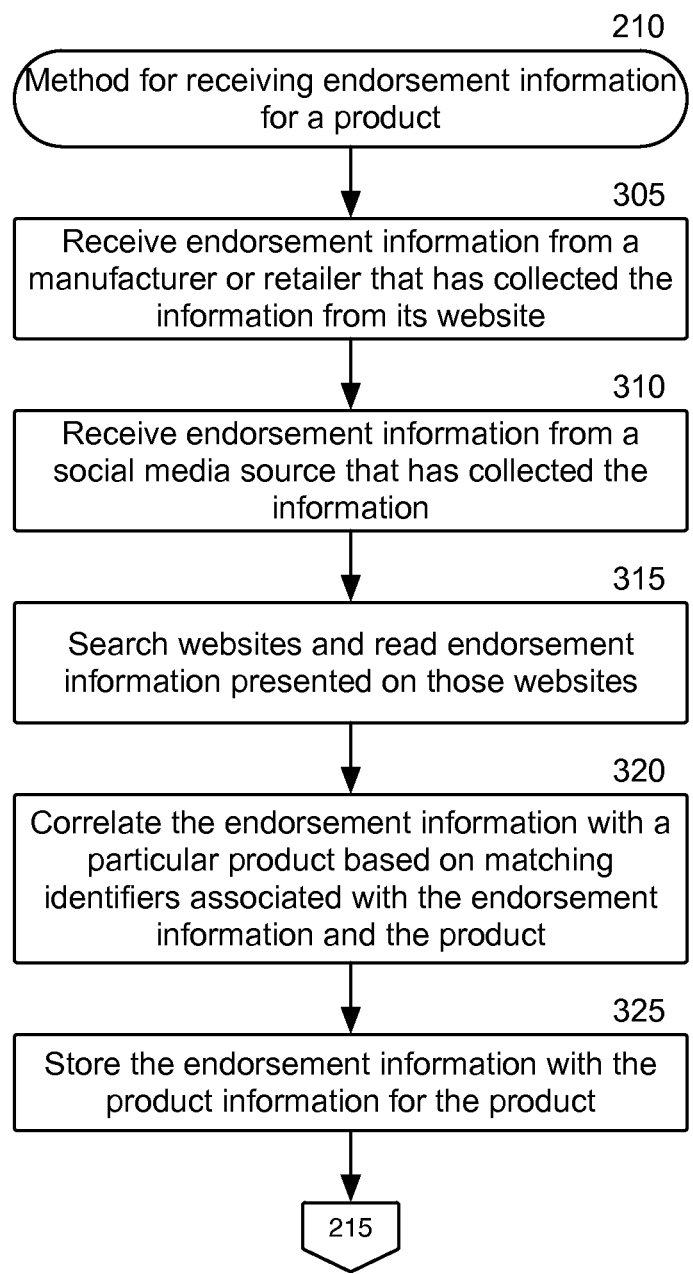
FIG. 3 is a block flow diagram depicting a method for receiving endorsement information for a product according to an exemplary embodiment, as referenced in block 210 of FIG. 2.

FIG. 3 is a block flow diagram depicting a method 210 for receiving endorsement information for a product according to an exemplary embodiment, as referenced in block 210 of FIG. 2. The method 210 will be described with reference to the components illustrated in FIG. 1.

In block 305, the receipt module 154 receives endorsement information from a manufacturer or retailer that has collected the information from its website. As discussed previously, the manufacturer or retailer may provide this information in batched or unbatched form via an electronic feed or electronic storage media.

In block 310, the receipt module 154 receives endorsement information from a social media source that has collected the information. As discussed previously, the social media source may provide this information in response to a request from the receipt module 154.

In block 315, a web crawler of the product catalog system 151 searches websites and reads endorsement information presented on those websites.

In block 320, the analysis module 153 correlates the endorsement information with a particular product in the product catalog 152, based on matching identifiers associated with the endorsement information and with each particular product. For example, the analysis module 153 can read the endorsement information and extract an identifier of a product associated with the endorsement information. Then, the analysis module 153 can associate the endorsement information with a product in the product catalog 152 having the same identifier.

In an exemplary embodiment, the endorsement information includes the identifier of a product. For example, the identifier of the product is obtained from the website from which the endorsement information is obtained, and the identifier is included in the endorsement information. When the manufacturers or retailers provide batch information, the identifier can be included in the endorsement information for each product in the batch information.

In block 325, the analysis module 153 stores the endorsement information with the corresponding product information for the product in the product catalog 152.

Blocks 305-325 can be repeated as desired to obtain endorsement information for multiple products or to obtain current endorsement information for products in the product catalog 152. For example, blocks 305-325 may be repeated at periodic or random intervals. Additionally, blocks 305-315 may be performed simultaneously or independently, as desired.

From block 325, the method 210 proceeds to block 215 (FIG. 2).

Figure 4:
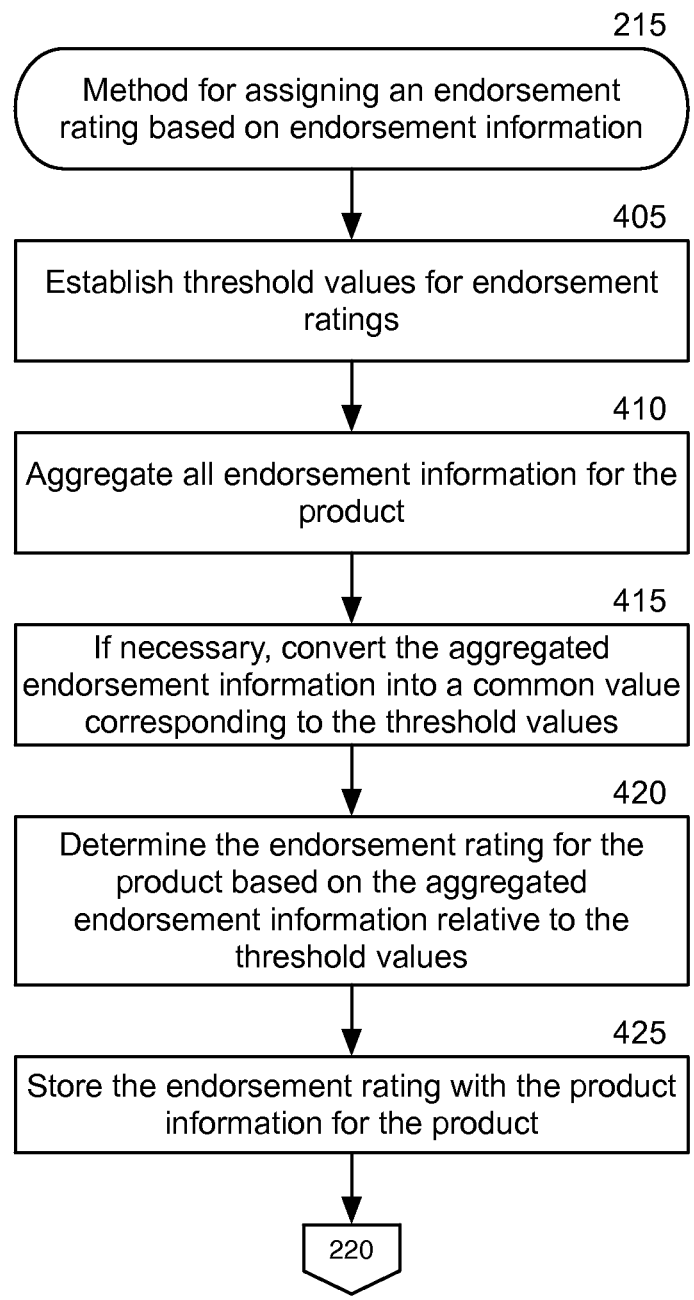
FIG. 4 is a block flow diagram depicting a method for assigning an endorsement rating based on the endorsement information according to an exemplary embodiment, as referenced in block 215 of FIG. 2.

FIG. 4 is a block flow diagram depicting a method 215 for assigning an endorsement rating based on the endorsement information according to an exemplary embodiment, as referenced in block 215 of FIG. 2. The method 215 will be described with reference to the components illustrated in FIG. 1.

In block 405, threshold values are established for endorsement ratings. In exemplary embodiments, a rating scale can be established and a minimum amount or value of endorsement information can be established for each step in the rating scale. For example, a rating scale of 0 to 5 can be established. Additionally, a minimum amount or value of endorsement information can be set for a rating at each step in the rating scale. For instance, a rating of five might require 100 "likes" or other favorable indications for the particular product, while a rating of three might require 50 "likes" or other favorable indications for the particular product. The rating scale and the minimum amount of endorsement information for each step in the scale is configurable to provide a desired rating.

In block 410, the analysis module 153 aggregates all collected endorsement information for a particular product. In certain exemplary embodiments, the endorsement information may be from a single source, such as a single website. Alternatively, the endorsement information may be from multiple sources, such as from multiple websites. In an exemplary embodiment, the analysis module 153 adds each instance of endorsement information for the particular product to obtain a total of the endorsement information. For example, the analysis module 153 may add the number of "likes" or other favorable indications obtained from a manufacturer that makes the product to the number of "likes" or other favorable indications obtained from a retailer that sells the product to obtain a sum of the "likes" or other favorable indications for the product.

In certain exemplary embodiments, the analysis module 153 can aggregate endorsement information that includes different types of information. For example, a "like" from one source, a "Plus 1" from another source, a "tweet" from another source, a favorable "rating" from another source, a favorable indication from another source, and/or a "buzz" from another source can be added together to obtain a sum of "6" (1+1+1+1+1+1=6) as the aggregated endorsement information. Unfavorable indications also can be considered when aggregating the endorsement information. For example, a "dislike" from one source, a "Plus 1" from another source, a "tweet" from another source, an unfavorable "rating" from another source, a favorable indication from another source, and/or a "buzz" from another source can be added together to obtain a sum of "2" (−1+1+1−1+1+1=2) as the aggregated endorsement information.

In an exemplary embodiment, endorsement information from one source can be weighted more than endorsement information from another source. For example, a more popular source may be given more weight than a less popular source when summing the endorsement information from each source.

In block 415, the analysis module 153 converts the aggregated endorsement information into a common value corresponding to the threshold values, if necessary. In this manner, the information can be normalized with the threshold values.

In block 420, the analysis module 153 determines the endorsement rating for the product based on the aggregated endorsement information relative to the threshold values for the rating scale. In an exemplary embodiment, the analysis module 153 compares the aggregated endorsement information to the threshold values and determines the endorsement rating based on the particular threshold value exceeded by the aggregated endorsement information.

For example, as discussed previously, a rating scale of 0 to 5 can be used, and a minimum amount or value of endorsement information can be required for a rating at each step in the rating scale. For instance, a rating of five might require 100 "likes" or other favorable indications for the particular product, while a rating of three might require 50 "likes" or other favorable indications for the particular product.

Alternatively, the aggregated endorsement information can be compared across related products to determine the endorsement rating for the particular product. In this case, the threshold values for each step in the rating can be based on a particular product's percentage of the total amount of endorsement information for all related products. For example, related products might include a 23 inch TV with an aggregated amount of endorsement information of 10, a 32 inch TV with an aggregated amount of endorsement information of 15, a 40 inch TV with an aggregated amount of endorsement information of 50, and a 50 inch TV with an aggregated amount of endorsement information of 100, all made by the same manufacturer. The aggregated amount of endorsement information for all products is (10+15+50+100) 175. The 50 inch TV is 57% (100/175) of the aggregated amount of endorsement information for all of the related products. If the threshold for an endorsement rating of 5 is 50%, then the 50 inch TV is assigned an endorsement rating of 5. The endorsement ratings of the 23, 32, and 40 inch TVs are assigned similarly, based on the threshold values established for each step in the rating.

In certain exemplary embodiments, the endorsement rating is an indication of how much users "like" a product. Accordingly, the endorsement rating may be referred to as a "likeness factor" or a "like rank."

In block 425, the analysis module 153 stores the endorsement rating for the product with the product information for the product in the product catalog 152.

From block 425, the method 215 proceeds to block 220 (FIG. 2).

Figure 5:
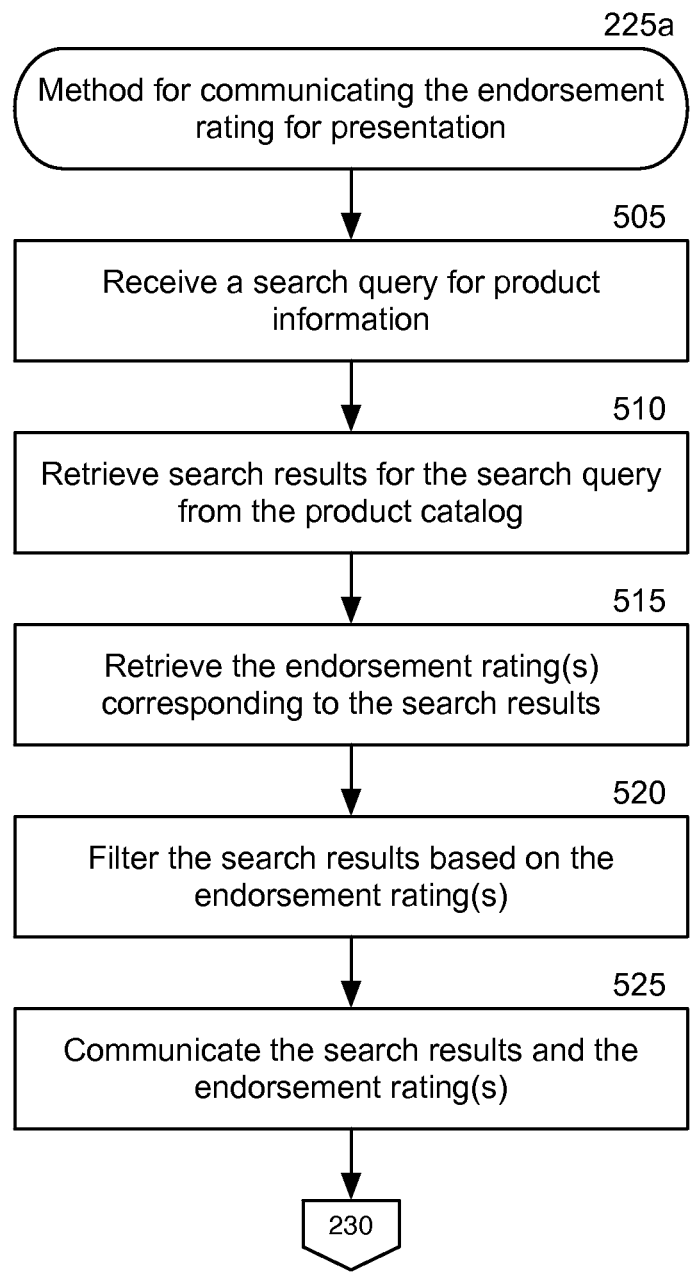
FIG. 5 is a block flow diagram depicting a method to for communicating the endorsement rating according to an exemplary embodiment, as referenced in block 225 of FIG. 2.

FIG. 5 is a block flow diagram depicting a method 225*a* for communicating the endorsement rating according to an exemplary embodiment, as referenced in block 225 of FIG. 2. The method 225*a* will be described with reference to the components illustrated in FIG. 1.

In block 505, the product catalog system 151 receives a search query for product information. In block 510, the product catalog system 151 retrieves search results for the search query from the product catalog 152. For example, the product catalog system 151 can search the product catalog 152 to identify products that match at least one component of the search query.

In block 515, the product catalog system 151 retrieves the endorsement ratings corresponding to the search results. For example, for each product in the search results, the product catalog system 151 retrieves the endorsement rating stored with the product information for the product in block 425 (FIG. 4).

In block 520, the analysis module 153 filters the search results based on the endorsement rating for each product in the search results. For example, if the search results include ten products, the analysis module 153 may limit the search results to the five products having the five highest endorsement ratings. Alternatively and/or additionally, the analysis module 153 may present products in the search results in rank order based on the endorsement ratings.

In block 525, the product catalog system 151 communicates the search results, including the endorsement ratings, in response to the search query.

In an exemplary embodiment, the search query received in block 505 can be received directly from the end-user network device 135. In this case, the search results are communicated in block 525 to the end-user network device 135.

In an alternative exemplary embodiment, the end user network device 135 may submit a search query to the manufacturer network device 105 or the retailer network device 117, which may host a websites for the manufacturer or retailer, respectively. In this case, the search query received in block 505 can be received from the manufacturer network device 105 or the retailer network device 117. Then, the search results are communicated and block 525 to the manufacturer network device 105 or the retailer network device 117 corresponding to the origin of the search query. This scenario is suitable for manufacturers and retailers that want the appearance of hosting their own websites. Although the search results originate from the product catalog system 151, the end-user is given the impression that the search results are generated from the manufacturer or the retailer.

From block 525, the method 225*a* proceeds to block 230 (FIG. 2).

Figure 6:
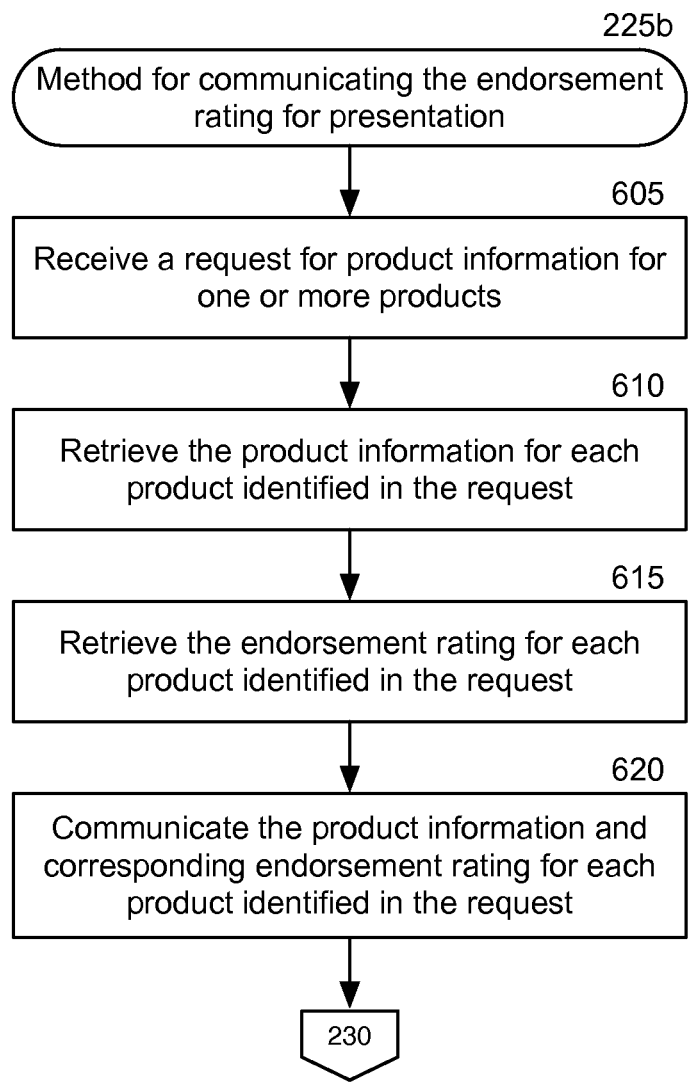
FIG. 6 is a block flow diagram depicting a method for communicating the endorsement rating according to an alternative exemplary embodiment, as referenced in block 225 of FIG. 2.

FIG. 6 is a block flow diagram depicting a method 225*b* for communicating the endorsement rating according to an alternative exemplary embodiment, as referenced in block 225 of FIG. 2. The method 225b will be described with reference to the components illustrated in FIG. 1.

In block 605, the product catalog system 151 receives a request for product information for one or more products. In block 610, the product catalog system 151 retrieves the product information for each product identified in the request. For example, the product catalog system 151 can search the product catalog 152 and can read the product information in the product catalog 152 for each product identified in the request.

In block 615, the product catalog system 151 retrieves the endorsement ratings corresponding for each product identified in the request. For example, for each product in the search request, the product catalog system 151 retrieves the endorsement rating stored with the product information for the product in block 425 (FIG. 4).

In block 625, the product catalog system 151 communicates the product information and corresponding endorsement rating for each product identified in the request. In this block, the product information and corresponding endorsement ratings are communicated from the product catalog system 151 to the manufacturer network device 105 or the retailer network device 117 that initiated the request in block 605.

The method 225b is suitable for manufacturers and retailers that host their own websites. The product information is maintained by the information provider 110, and the manufacturer or retailer periodically obtains product information and endorsement ratings from the product catalog system 151. The manufacturer network device 105 or retailer network device 117 stores the product information and endorsement ratings and presents search results from the stored data when requested by an end user network device 135.

From block 620, the method 225b proceeds to block 230 (FIG. 2).

Figure 7:
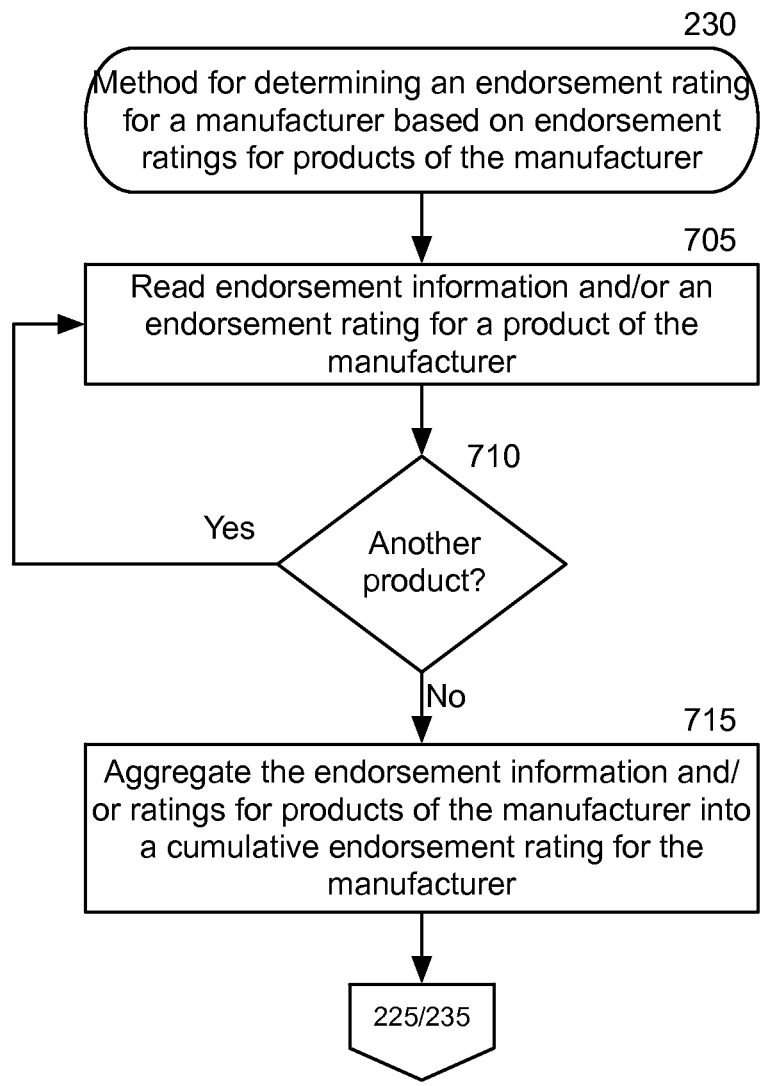
FIG. 7 is a block flow diagram depicting a method for determining an endorsement rating for a manufacturer based on endorsement ratings for products of the manufacturer according to an exemplary embodiment, as referenced in block 230 of FIG. 2.

FIG. 7 is a block flow diagram depicting a method 230 for determining an endorsement rating for a manufacturer based on endorsement ratings for products of the manufacturer according to an exemplary embodiment, as referenced in block 230 of FIG. 2. The method 230 will be described with reference to the components illustrated in FIG. 1.

In block 705, the analysis module 153 reads endorsement information and/or an endorsement rating for a product of the manufacturer. For example, the analysis module 153 may search the product catalog 152 to identify a product of the manufacturer or a specified product of the manufacturer and may read the endorsement information and the endorsement rating stored with the product information for the product.

Via block 710, the analysis module 153 determines whether to obtain endorsement information and/or ratings for another product of the manufacturer. For example, the analysis module 153 may read such information for all products of the manufacturer that is stored in the product catalog 152. Alternatively, the analysis module 153 may read such information for specified products of the manufacturer that is stored in the product catalog 152. If the analysis module 153 determines in block 710 to read such information for any other product of the manufacturer, the method 230 repeats block 705 until all data is obtained for the products of the manufacturer. When the analysis module 153 determines in block 710 that it will not read information for another product of the manufacturer, the method 230 proceeds to block 715.

In block 715, the analysis module 153 aggregates the endorsement information and/or ratings for products of the manufacturer into a cumulative endorsement rating for the manufacturer. The method performed in block 715 may be similar to the method performed in blocks 410 and 420 described previously with reference to FIG. 4. For example, all "likes" or other favorable indications for products of the manufacturer can be summed to create a total of all "likes" or other favorable indications for products of the manufacturer. Unfavorable indications also may be considered in this analysis. Then, the total value can be correlated to threshold values for each step on a rating scale.

From block 715, the method 230 proceeds to block 225 to communicate the endorsement rating for the manufacturer in a manner similar to communicating the endorsement rating described with reference to FIGS. 5 and 6, and the method 230 also proceeds to block 235 (FIG. 2).

An endorsement rating for any merchant can be determined in a manner similar to determining the endorsement rating for the manufacturer.

Figure 8:
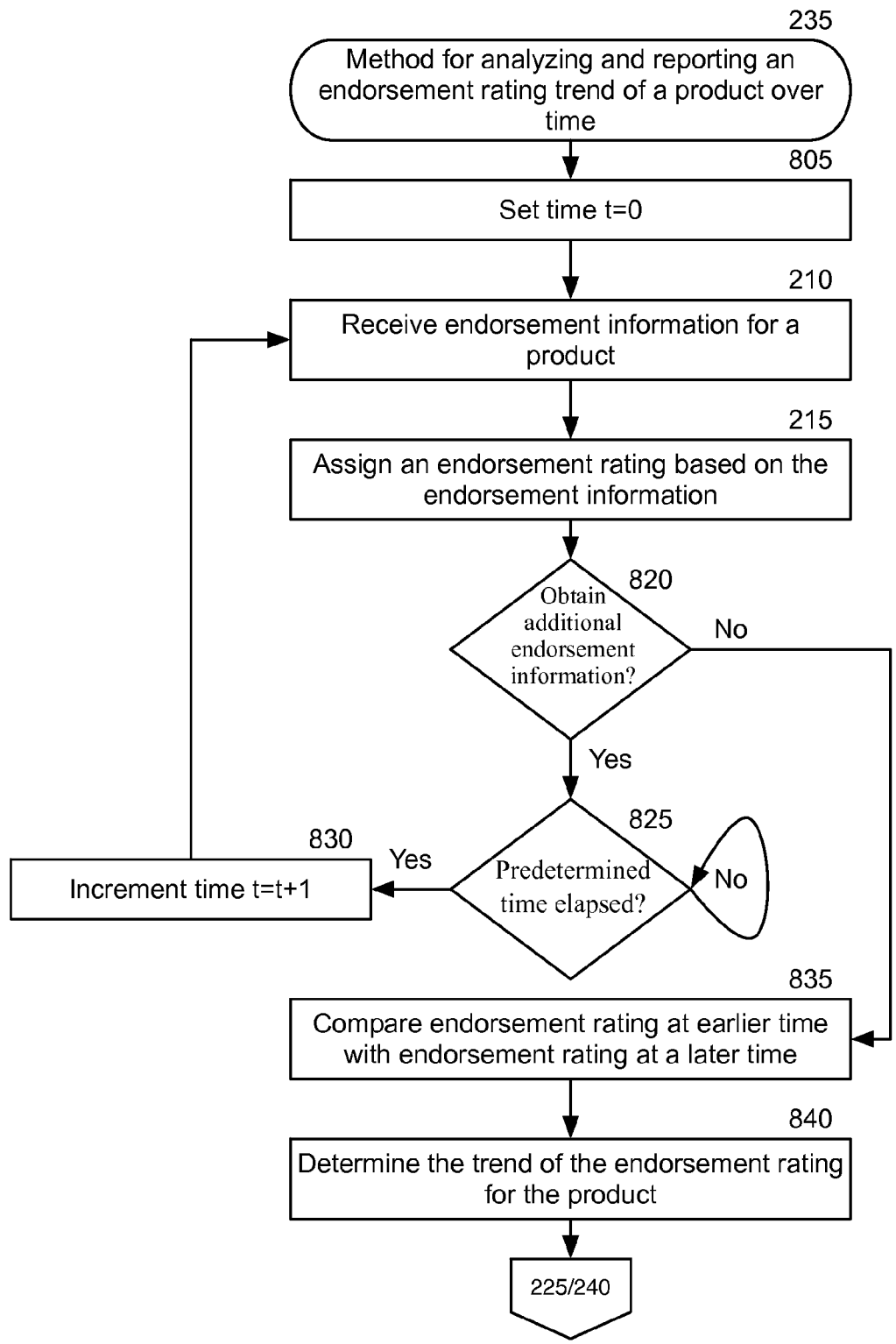
FIG. 8 is a block flow diagram depicting a method for analyzing and reporting an endorsement rating trend of a product over time according to an exemplary embodiment, as referenced in block 235 of FIG. 2.

FIG. 8 is a block flow diagram depicting a method 235 for analyzing and reporting an endorsement rating trend of a product over time according to an exemplary embodiment, as referenced in block 235 of FIG. 2. The method 235 will be described with reference to the components illustrated in FIG. 1.

In block 805, the analysis module 153 sets a time parameter equal to zero. Then, the receipt module 154 performs the method 210 described previously with reference to FIG. 3 to receive endorsement information for a product. Then, the analysis module 153 performs the method 215 described previously with reference to FIG. 4 to assign an endorsement rating to the product based on the endorsement information.

In block 820, the analysis module 153 determines whether to obtain additional endorsement information. For example, at least two values are needed to obtain a trend over time. Accordingly, if only one value has been obtained, the analysis module 153 will determine in block 820 to obtain additional information. Alternatively, a predetermined amount of information may be desired and can be configured by a user of the product catalog system 151. In this case, the analysis module 153 will determine in block 820 to obtain additional endorsement information until the configured setting is met.

If the analysis module 153 determines in block 820 to obtain additional endorsement information, the method 235 proceeds to block 825. In block 825, the analysis module 153 determines whether a predetermined amount of time has elapsed since performing the methods 210 and 215. If the predetermined amount of time has not elapsed, the analysis module 153 waits for the predetermined amount of time to elapse.

When the predetermined amount of time has elapsed, the method 235 proceeds to block 830. In block 830, the analysis module 153 increments the time parameter and repeats blocks 210, 215, and 820 until the desired endorsement information and ratings have been obtained.

When the analysis module 153 determines in block 820 that it will not obtain additional endorsement information and ratings, the method 235 proceeds to block 835.

In block 835, the analysis module 153 compares an endorsement rating obtained at an earlier time with at least one endorsement rating obtained at a later time.

Then, in block 840, the analysis module 153 determines a trend of the endorsement rating for the product. For example, if the endorsement rating at an earlier time is lower than an endorsement rating at a later time, the analysis module 153 determines that the trend is positive. Alternatively, if the endorsement rating at an earlier time is higher than an endorsement rating at a later time, the analysis module 153 determines that the trend is negative. Additionally, if the endorsement rating at an earlier time is the same or substantially the same as the endorsement rating at a later time, the analysis module 153 determines that the trend is constant. In this case, substantially the same means within a configurable range higher or lower then the endorsement rating at the earlier time. The analysis module 153 may consider more than two endorsement ratings in determining the trend. For example, the analysis module 153 may provide multiple endorsement ratings trends over time or an overall endorsement rating trend from the first time to the last time.

From block 840, the method 235 proceeds to block 225 to communicate the endorsement rating trend in a manner similar to communicating the endorsement rating described with reference to FIGS. 5 and 6, and the method 235 also proceeds to block 240 (FIG. 2).

Figure 9:
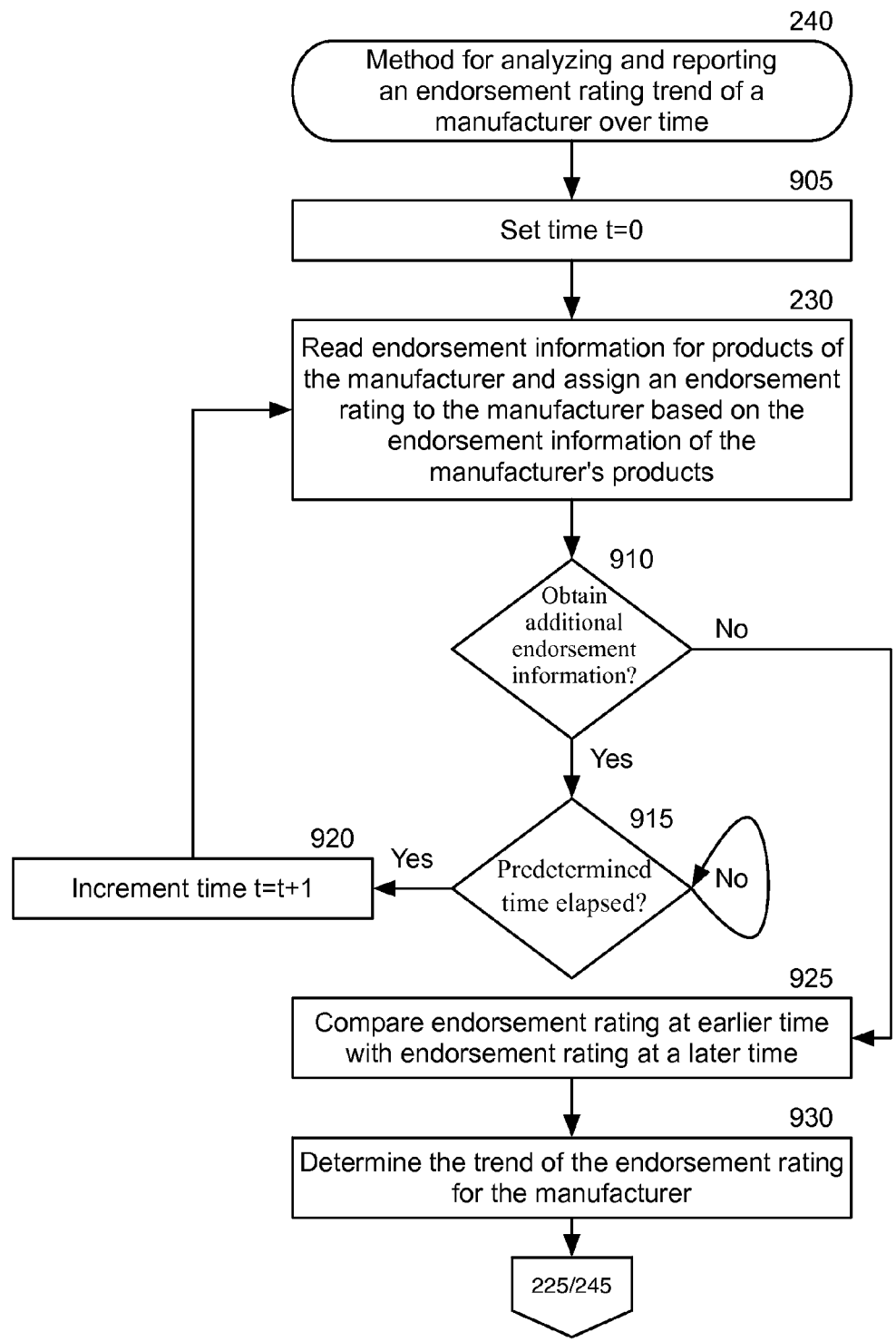
FIG. 9 is a block flow diagram depicting a method for analyzing and reporting an endorsement rating trend of a manufacturer over time according to an exemplary embodiment, as referenced in block 240 of FIG. 2.

FIG. 9 is a block flow diagram depicting a method 240 for analyzing and reporting an endorsement rating trend of a manufacturer over time according to an exemplary embodiment, as referenced in block 240 of FIG. 2.

In block 905, the analysis module 153 sets a time parameter equal to zero. Then, the analysis module 153 performs the method 230 described previously with reference to FIG. 7 to receive endorsement information for products of the manufacturer and to assign an endorsement rating to the manufacturer based on the endorsement information for the products of the manufacturer.

In block 910, the analysis module 153 determines whether to obtain additional endorsement information. For example, at least two values are needed to obtain a trend over time. Accordingly, if only one value has been obtained, the analysis module 153 will determine in block 820 to obtain additional information. Alternatively, a predetermined amount of information may be desired and can be configured by a user of the product catalog system 151. In this case, the analysis module 153 will determine in block 820 to obtain additional endorsement information until the configured setting is met.

If the analysis module 153 determines in block 910 to obtain additional endorsement information, the method 240 proceeds to block 915. In block 915, the analysis module 153 determines whether a predetermined amount of time has elapsed since performing the method 230. If the predetermined amount of time has not elapsed, the analysis module 153 waits for the predetermined amount of time to elapse.

When the predetermined amount of time has elapsed, the method 240 proceeds to block 920. In block 920, the analysis module 153 increments the time parameter and repeats blocks 230 and 910 until the desired endorsement information and ratings have been obtained.

When the analysis module 153 determines in block 910 that it will not obtain additional endorsement information and ratings, the method 240 proceeds to block 925.

In block 925, the analysis module 153 compares an endorsement rating obtained at an earlier time with at least one endorsement rating obtained at a later time.

Then, in block 930, the analysis module 153 determines a trend of the endorsement rating for the manufacturer. For example, if the endorsement rating at an earlier time is lower than an endorsement rating at a later time, the analysis module 153 determines that the trend is positive. Alternatively, if the endorsement rating at an earlier time is higher than an endorsement rating at a later time, the analysis module 153 determines that the trend is negative. Additionally, if the endorsement rating at an earlier time is the same or substantially the same as the endorsement rating at a later time, the analysis module 153 determines that the trend is constant. In this case, substantially the same means within a configurable range higher or lower then the endorsement rating at the earlier time. The analysis module 153 may consider more than two endorsement ratings in determining the trend. For example, the analysis module 153 may provide multiple endorsement ratings trends over time or an overall endorsement rating trend from the first time to the last time.

From block 930, the method 240 proceeds to block 225 to communicate the endorsement rating trend for the manufacturer in a manner similar to communicating the endorsement rating described with reference to FIGS. 5 and 6, and the method 240 also proceeds to block 240 (FIG. 2).

An endorsement rating trend for any merchant can be analyzed and reported in a manner similar to analyzing and reporting the endorsement rating trend for the manufacturer.

Figure 10:
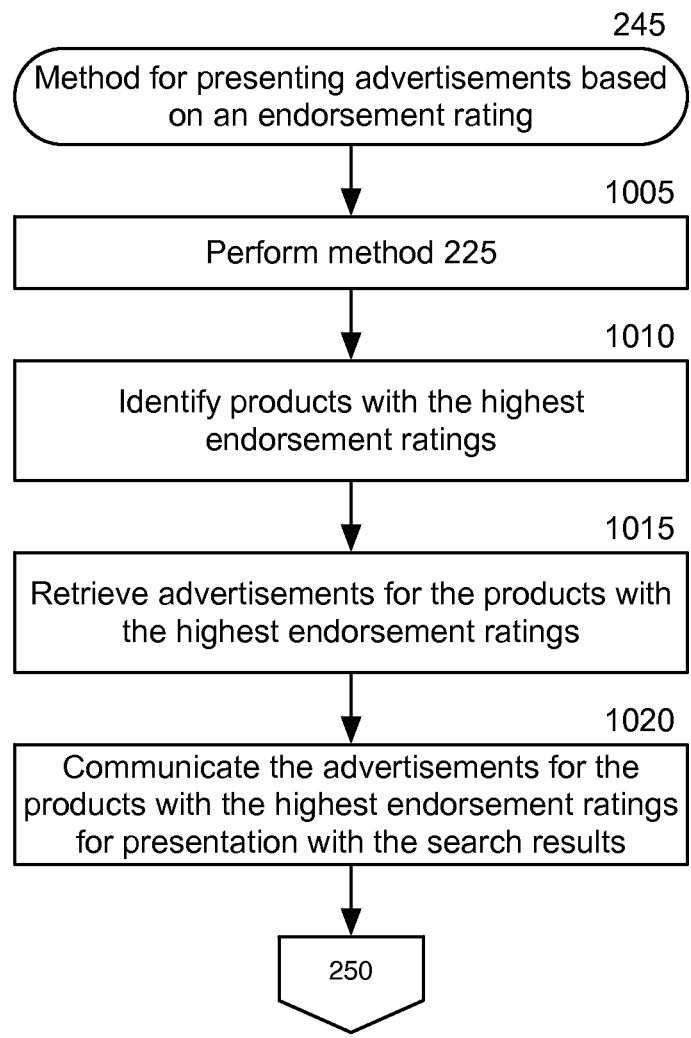
FIG. 10 is a block flow diagram depicting a method for presenting advertisements based on an endorsement rating according to an exemplary embodiment, as referenced in block 245 of FIG. 2.

FIG. 10 is a block flow diagram depicting a method 245 for presenting advertisements based on an endorsement rating according to an exemplary embodiment, as referenced in block 245 of FIG. 2. The method 245 will be described with reference to the components illustrated in FIG. 1.

In block 1005, the method 225a is performed. The method 225a has been described previously with reference to FIG. 5.

In block 1010, the analysis module 153 identifies products in the search results with the highest endorsement ratings. Then, in block 1015, the advertisement presentment module 155 retrieves advertisements for the products with the highest endorsement ratings. In an exemplary embodiment, the advertisements can be stored in the product catalog system 151, for example, in the product catalog 152. In an alternative exemplary embodiment, the advertisements can be stored in a separate storage medium. In exemplary embodiments, advertisements can be returned for only the highest rated product, for a predetermined number of the highest rated products, or for all rated products.

After retrieval of the advertisements, the advertisement presentment module 155 communicates in block 1020 the retrieved advertisements for the products with the highest endorsement ratings for presentation with the search results. This communication method can be performed in a manner similar to block 525 discussed previously with reference to FIG. 5. Additionally or alternatively, block 1020 can be performed simultaneously with block 525 when the search results are communicated.

From block 1020, the method 245 proceeds to block 250 (FIG. 2).

Figure 11:
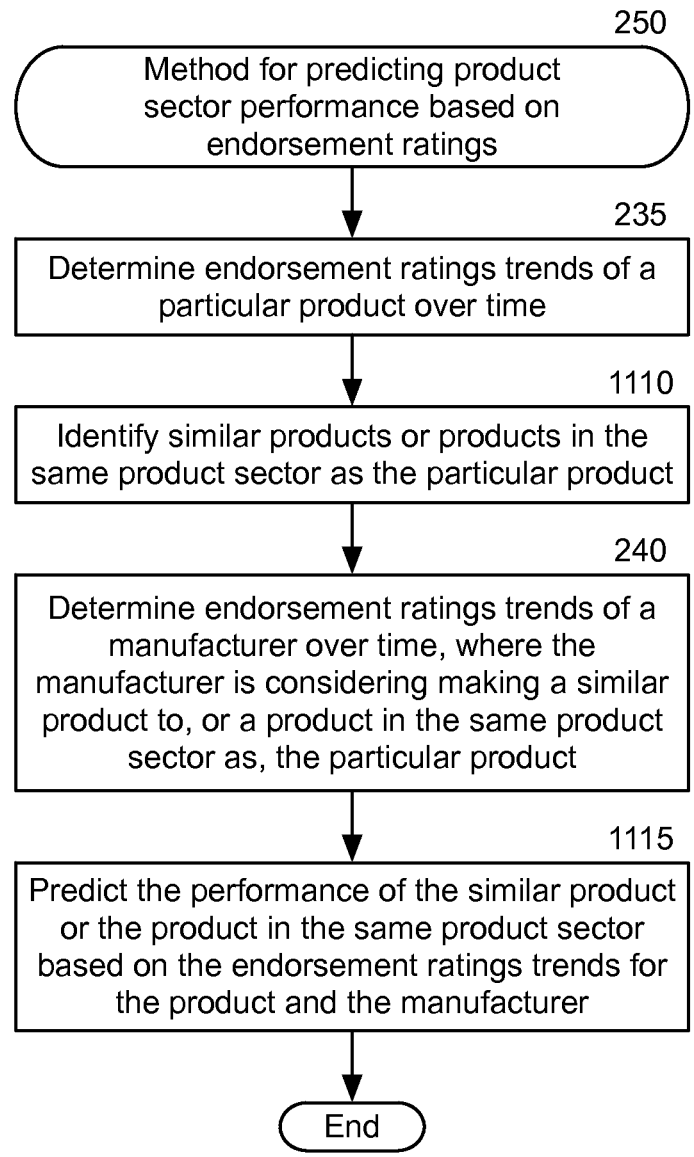
FIG. 11 is a block flow diagram depicting a method for predicting product sector performance based on endorsement ratings according to an exemplary embodiment, as referenced in block 250 of FIG. 2.

FIG. 11 is a block flow diagram depicting a method 250 for predicting product sector performance based on endorsement ratings according to an exemplary embodiment, as referenced in block 250 of FIG. 2. The method 250 will be described with reference to the components illustrated in FIG. 1.

In block 235, the analysis module 153 performs the method 235 to determine an endorsement rating trend of a particular product over time. The method 235 has been described previously with reference to FIG. 8.

In block 1110, the analysis module 153 identifies products that are similar to the particular product or products that are in the same product sector as the particular product. For example, product relationships and product sector relationships may be stored in the product catalog 152 or in another database. In this case, the analysis module 153 can read the similar products or the products in the same product sector. Alternatively, the analysis module 153 may receive an input of the similar product of interest or the product sector of interest from a user of the product catalog system 151. For example, a manufacturer that desires to market a product similar to the particular product may input the similar product or the product sector.

The analysis module 153 them performs the method 240 to determine an endorsement rating trend of a manufacturer over time, where the manufacturer is considering making a similar product to, or a product in the same product sector as, the particular product.

In block 1115, the analysis module 153 predicts the performance of the similar product or the product in the same product sector based on the endorsement rating trends for the particular product and the manufacturer. For example, if the endorsement rating trend of the particular product and the endorsement rating trend of the manufacturer are both positive, the analysis module 153 can determine that the similar product or the product in the same product sector may fare well in the market. Alternatively, if either the endorsement rating trend for the particular product or the endorsement rating trend of manufacturer is negative, the analysis module 153 can determine that the similar product or the product in the same product sector may not fare well in the market. In other exemplary embodiments, the analysis module 153 may consider only the endorsement rating trend of the particular product to predict the performance of a similar product or a product in the same product sector. In exemplary embodiments, the product and product sector performance also can be based on a current product endorsement rating individually, or in combination with a current merchant rating.

Product and product sector performance also can be predicted for any merchant that is considering marketing a product, which can include considering the merchant's endorsement rating trend in a manner similar to considering the manufacturer's rating trend.

In an exemplary embodiment, the endorsement information can be categorized based on a location of each particular user that provides endorsement information. For example, location information corresponding to the user can be obtained when the user provides the endorsement information. The location information is saved with the endorsement information. The endorsement rating can be determined as described previously. Additionally, endorsement ratings can be determined for particular locations, such as a city, state, region, or country. Endorsement information and ratings also can be broken down to show location information. For example, if 200 people provide endorsement information for a product, further presented information can show that 50 people from California liked the product, 50 people from Ohio liked the product, 50 people from Oklahoma City liked the product, and 100 people from Oregon liked the product, while 50 people from Canada disliked the product. Endorsement ratings for each of these locations can be provided based on the endorsement information for each location. The location information can be provided at a granularity level that is consistent with the granularity of the location information that is provided or obtained from the users.

The endorsement ratings and information described herein also can be combined with user product ratings and/or product reviews, which may include comments, ratings, recommendations, opinions, and/or a personal account or report for the product. The product reviews and ratings may include product reviews/ratings published by consumers and/or product reviews/ratings published by experts or columnists having detailed knowledge of the product and other products in the same field or technology.

General

The exemplary methods and blocks described in the embodiments presented previously are illustrative, and, in alternative embodiments, certain blocks can be performed in a different order, in parallel with one another, omitted entirely, and/or combined between different exemplary methods, and/or certain additional blocks can be performed, without departing from the scope and spirit of the invention. Accordingly, such alternative embodiments are included in the invention described herein.

The invention can be used with computer hardware and software that performs the methods and processing functions described above. As will be appreciated by those having ordinary skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGAs), etc.

Although specific embodiments of the invention have been described above in detail, the description is merely for purposes of illustration. Various modifications of, and equivalent blocks corresponding to, the disclosed aspects of the exemplary embodiments, in addition to those described above, can be made by those having ordinary skill in the art without departing from the spirit and scope of the invention defined in the following claims, the scope of which is to be accorded the broadest interpretation so as to encompass such modifications and equivalent structures.

What is claimed is:

1. A computer-implemented method for communicating product endorsement information, comprising:
    receiving, by one or more computing devices, a plurality of indications of endorsement for a product, each of the plurality of indications of endorsement being associated with a social site and being obtained from a first electronic document associated with the product;
    assigning, by the one or more computing devices, a value to an aggregation of the plurality of indications of endorsement for the product;
    determining, by the one or more computing devices, which threshold value for a rating of a plurality of ratings within a rating scale is met by the value assigned to the plurality of indications of endorsement for the product;
    assigning, by the one or more computing devices, an endorsement rating that corresponds to the threshold value determined from the plurality of ratings within the rating scale that is met by the value assigned to the plurality of indications of endorsement for the product; and
    communicating, by the one or more computing devices, product information for the product for presentation via a second electronic document associated with the product, the product information comprising at least the endorsement rating.

2. The computer-implemented method of claim 1, further comprising generating an endorsement rating for a merchant based on an endorsement rating assigned for one or more products, wherein communicating the product information for the product further comprises communicating the endorsement rating for the merchant.

3. The computer-implemented method of claim 1, further comprising:
    receiving, by the one or more computing devices, a plurality of indications of endorsement for the product from a third electronic document associated with the product, each of the plurality of indications of endorsement received from the third electronic document being associated with a social site; and
    aggregating, by the one or more computing devices, the plurality of indications of endorsement from the first and third electronic documents, wherein the assigned value is based on the aggregation of the plurality of indications of endorsement for the product from the first and third electronic documents.

4. The computer-implemented method of claim 3, wherein the endorsement rating for the product is based on the aggregated indications of endorsement from the first and third electronic documents, and wherein communicating the product information for the product further comprises communicating the endorsement rating based on the aggregated indications of endorsement for the product from the first and third electronic documents.

5. The computer-implemented method of claim 3, wherein the second electronic document comprises at least one of the first and third electronic documents.

6. The computer-implemented method of claim 3, further comprising weighting the plurality of indications of endorsement for the product from the third electronic document associated with the product.

7. The computer-implemented method of claim 1, wherein communicating the product information for the product further comprises communicating information about the product for presentation with the endorsement rating for the product, in response to a search query or a request for product information.

8. The computer-implemented method of claim 1, wherein the plurality of indications of endorsement comprises a number of selections of a control associated with a favorable or unfavorable indication of value for the product.

9. The computer-implemented method of claim 1, wherein the plurality of indications of endorsement comprises a number of "likes," "dislikes," "shares," or "plus 1s" for the product.

10. The computer-implemented method of claim 1, wherein at least one of the first and second electronic documents is a webpage.

11. The computer-implemented method of claim 1, further comprising establishing, by the one or more computing devices, the plurality of endorsement ratings within the rating scale.

12. The computer-implemented method of claim 1, further comprising establishing, by the one or more computing devices, threshold values for each rating of the plurality of ratings within the rating scale.

13. The computer-implemented method of claim 1, further comprising correlating, by the one or more computing devices, each of the plurality of indications of endorsement with the product, wherein the indications of endorsement for the product comprise a product identifier, and wherein correlating each of the plurality of indications of endorsement with the product comprises matching the product identifier with the product.

14. The computer-implemented method of claim 1, further comprising correlating, by the one or more computing devices, each of the plurality of indications of endorsement with the product, wherein the first electronic document associated with the product comprises a product identifier, and wherein correlating each of the plurality of indications of endorsement with the product comprises matching the product identifier with the product.

15. The computer-implemented method of claim 1, wherein the threshold values for each rating of the plurality of ratings within the rating scale are based on a product's percentage of a total amount of the plurality of indications of endorsement for one or more related products.

16. The computer-implemented method of claim 1, further comprising filtering the product information based at least in part on the endorsement rating for the product and wherein the endorsement rating for the product communicated for presentation via the second electronic document comprises the filtered product information.

17. The computer-implemented method of claim 1, wherein the product information for the product communicated for presentation via the second electronic document comprises an advertisement for the product.

18. A computer program product, comprising: a non-transitory computer-readable medium having computer-readable program instructions embodied thereon that when executed by a computer cause the computer to communicate product endorsement information, the computer-readable program instructions comprising:

computer-readable program instructions to receive a plurality of indications of endorsement for a product, each of the plurality of indications of endorsement being associated with a social site and being obtained from a first electronic document associated with the product;

computer-readable program instructions to assign a value to the plurality of indications of endorsement for the product;

computer-readable program instructions to determine which threshold value for each rating of the plurality of ratings within the rating scale is met by the value assigned to the plurality of indications of endorsement for the product computer-readable program instructions to assign an endorsement rating that corresponds to the threshold value determined from the plurality of ratings within the rating scale that is met by the value assigned to plurality of indications of endorsement for the product; and computer-readable program instructions to communicate product information for the product for presentation via a second electronic document associated with the product, the product information comprising at least the endorsement rating.

19. The computer program product of claim 18, further comprising computer-readable program instructions to establishing the plurality of ratings within the rating scale.

20. The computer program product of claim 18, further comprising computer-readable program instructions for generating an endorsement rating to a merchant based on an endorsement rating assigned for one or more products, wherein communicating the product information for the product further comprises computer-readable program instructions for communicating the endorsement rating for the merchant.

21. The computer program product of claim 18, further comprising: computer-readable program instructions to receiving a plurality of indications of endorsement for the product from a third electronic document associated with the product, each of the plurality of indications of endorsement received from the third electronic document being associated with a social site; and computer-readable program instructions to aggregating the plurality of indications of endorsement from the first and third electronic documents, wherein the assigned value is based at least in part on the plurality of indications of endorsement for the product from the first and third electronic documents.

22. The computer program product of claim 18, wherein the plurality of indications of endorsement comprises a number of selections of a control associated with a favorable or unfavorable indication of value for the product.

23. The computer program product of claim 18, wherein the threshold values for each rating of the plurality of ratings within the rating scale are based on a product's percentage of a total amount of the plurality of indications of endorsement for one or more related products.

24. A system for communicating product endorsement information, comprising:
- a storage device; and
- a processor configured to execute computer-executable instructions stored in the storage device to cause the system to:
- receive a plurality of indications of endorsement for a product, each of the plurality of indications of endorsement being associated with a social site and being obtained from a first electronic document associated with the product;
- assign a value to the plurality of indications of endorsement for the product
- determine a threshold value for a rating of a plurality of ratings within the rating scale that is met by the value assigned to the plurality of indications of endorsement for the product
- assign an endorsement rating that corresponds to the threshold value determined from the plurality of ratings within a rating scale that is met by the value assigned to the plurality of indications of endorsement for the product; and
- communicate product information for the product for presentation via a second electronic document associated with the product, the product information comprising at least the endorsement rating.

25. The system of claim 22, wherein the processor is further configured to execute computer-executable instructions stored in the storage medium to cause the system to establish the plurality of ratings within the rating scale.

26. The system of claim 24, wherein the processor is further configured to execute computer-executable instructions stored in the storage medium to cause the system to establish the threshold values for each rating of the plurality of ratings within the rating scale.

27. The system of claim 24, wherein the processor is further configured to execute computer-executable instructions stored in the storage medium to cause the system to generating an endorsement rating for a merchant based on an endorsement rating assigned for one or more products, wherein communicating the product information for the product further comprises communicating the endorsement rating for the merchant.

28. The system of claim 24, wherein the processor is further configured to execute computer-executable instructions stored in the storage medium to cause the system to:
- receive a plurality of indications of endorsement for the product from a third electronic document associated with the product, each of the plurality of indications of endorsement received from the third electronic document being associated with a social site; and
- aggregate the plurality of indications of endorsement from the first and third electronic documents, wherein the assigned value is based at least in part on the plurality of indications of endorsement for the product from the first and third electronic documents.

29. The system of claim 24, wherein the plurality of indications of endorsement comprises a number of selections of a control associated with a favorable or unfavorable indication of value for the product.

30. The system of claim 24, wherein the threshold values for each rating of the plurality of ratings within the rating scale are based on a product's percentage of a total amount of the plurality of indications of endorsement for one or more related products.

* * * * *